(12) United States Patent
Martinez et al.

(10) Patent No.: US 12,019,510 B2
(45) Date of Patent: Jun. 25, 2024

(54) RANDOM NUMBER GENERATOR

(71) Applicant: STMICROELECTRONICS (ROUSSET) SAS, Rousset (FR)

(72) Inventors: Albert Martinez, Bouc Bel Air (FR); Patrick Haddad, Peypin (FR)

(73) Assignee: STMICROELECTRONICS (ROUSSET) SAS, Rousset (FR)

( * ) Notice: Subject to any disclaimer, the term of this patent is extended or adjusted under 35 U.S.C. 154(b) by 101 days.

(21) Appl. No.: 17/684,198

(22) Filed: Mar. 1, 2022

(65) Prior Publication Data
US 2022/0283896 A1  Sep. 8, 2022

(30) Foreign Application Priority Data

Mar. 5, 2021  (FR) ...................... 2102165

(51) Int. Cl.
*G06F 7/58* (2006.01)
*G06F 11/10* (2006.01)
*G06F 11/26* (2006.01)

(52) U.S. Cl.
CPC ................ *G06F 11/10* (2013.01); *G06F 7/58* (2013.01); *G06F 11/26* (2013.01)

(58) Field of Classification Search
CPC . G06F 11/10; G06F 7/58; G06F 11/26; G06F 21/71
USPC ........................ 714/718, 739, 787
See application file for complete search history.

(56) References Cited

U.S. PATENT DOCUMENTS

| 6,324,558 | B1 * | 11/2001 | Wilber | ............... | G06F 7/588 |
| | | | | | 708/250 |
| 2014/0304316 | A1 * | 10/2014 | Thulasiraman | ......... | G06F 7/588 |
| | | | | | 708/250 |
| 2014/0366135 | A1 * | 12/2014 | Teglia | .................. | G06F 21/556 |
| | | | | | 726/23 |
| 2016/0112189 | A1 * | 4/2016 | Tomaru | ................ | H04L 9/0822 |
| | | | | | 380/268 |
| 2016/0246573 | A1 * | 8/2016 | Bucci | ..................... | G06F 7/584 |
| 2018/0241557 | A1 * | 8/2018 | Maes | .................... | H04L 9/0866 |
| 2022/0066918 | A1 * | 3/2022 | El Housni | ............. | G06F 7/588 |

OTHER PUBLICATIONS

Gantel et al., "A FPGA-Based Post-Processing and Validation Platform for Random Number Generations," IEEE International Parallel and Distributed Processing Symposium Workshops (IPDPSW), May 18-22, 2020, New Orleans, LA, 4 pages.
Pareschi et al., On Statistical Tests for Randomness Included in the NIST SP800-22 Test Suite and Based on the Binomial Distribution, *IEEE Transactions on Information Forensics and Security* 7(2):491-505, Apr. 2012.
Turan et al., Recommendation for the Entropy Sources Used for Random Bit Generation, NIST Special Publication 800-90B, https://doi.org/10.6028/NIST.SP.800-90B, Jan. 2018, 84 pages.

* cited by examiner

*Primary Examiner* — Guy J Lamarre
*Assistant Examiner* — Osman M Alshack
(74) *Attorney, Agent, or Firm* — Seed IP Law Group LLP

(57) ABSTRACT

The present disclosure relates to a circuit for testing a random number generator adapted to delivering a series of random bits and comprising at least one test unit configured to detect a defect in the series of random bits, said test circuit being adapted to verifying whether, after the detection of a first defect by the test unit, the number of random bits, generated by the random number generator without the detection of a second defect by said unit test, is smaller than a first threshold.

31 Claims, 3 Drawing Sheets

RANDOM NUMBER GENERATOR

BACKGROUND

Technical Field

The present disclosure generally concerns random number generation and, more particularly, random number generators. Random number generators generally comprise test circuits verifying the operation of the random number generator. The present disclosure relates to a random number generator testing circuit.

Description of the Related Art

Random number generators (TRNG, True Random Number Generator) are devices capable of generating sequences of numbers for which there exists no deterministic link between a number and its predecessor(s).

Random number generators are used in all sorts of fields, but particularly in the field of computer security. Random numbers are typically used in data ciphering for the generation of cipher and/or decipher keys.

The generation of a random number may be performed based, for example, on physical phenomena, on analog signals processing operations, and/or on digital signal processing operations.

A random number generator is characterized by its entropy. A random number generator may comprise one or a plurality of test circuits enabling to detect and/or estimate the evolution, or the variation, in most cases the drop, of its entropy.

BRIEF SUMMARY

There is a need for higher-performance random number generators.

There is a need for random number generators having a higher entropy.

There is a need for higher-performance random number generator testing circuits.

An embodiment may facilitate addressing all or part of the disadvantages of known random number generators.

An embodiment may facilitate addressing all or part of the disadvantages of known random number generator testing circuits.

One embodiment provides a circuit for testing a random number generator adapted to delivering a series of random bits and comprising at least one test unit configured to detect a defect in the series of random bits, said test circuit being adapted to verifying whether, after the detection of a first defect by the test unit, the number of random bits, generated by the random number generator without the detection of a second defect by said unit test, is smaller than a first threshold.

According to an embodiment, the first threshold is equal to the inverse of the probability of occurrence of said defect.

According to an embodiment, the defect is a series of N successive bits all of same value.

According to an embodiment, the defect is a series of N successive bits, all equal to "1."

According to an embodiment, the defect is a series of N successive bits all equal to "0."

According to an embodiment, N is equal to 34.

According to an embodiment, the defect is a series of M successive bits having a sum greater than a second threshold.

According to an embodiment, M is equal to 1,024 and the second threshold is equal to 628.

According to an embodiment, the random number generator comprises at least two test units arranged in parallel.

According to an embodiment, said at least two test units look for different defects.

Another embodiment provides a random number generator comprising a test circuit disclosed herein.

According to an embodiment, the random number generator comprises a source capable of generating the series of random bits.

According to an embodiment, the source comprises a noise source and a digitizing stage.

According to an embodiment, the random number generator comprises a processing unit adapted to applying a mathematical processing to the series of random bits.

In an embodiment, a device comprises: an input, which in operation, receives indications of detection of a first type of defect in a random bit sequence; defect testing circuitry, coupled to the input, wherein the defect testing circuitry, in operation, generates an indication of whether detection of the first type of defect is repeated within a threshold number of bits of the random bit sequence.

In an embodiment, a system, comprises: a plurality of random sequence error detection circuits, which, in operation, detect errors in a random bit sequence; and defect testing circuitry, coupled to the plurality of random sequence error detection circuits, wherein the defect testing circuitry, in operation, generates an indication of whether one of the plurality of random sequence error detection circuits detects two errors in the random bit sequence within a threshold number of bits of the random bit sequence.

In an embodiment, a method comprises: detecting a first type of defect in a random bit sequence; and generating an indication of whether detection of the first type of defect is repeated within a threshold number of bits of the random bit sequence based on the detection of the first type of defect.

In an embodiment, a non-transitory computer-readable medium's contents cause processing circuitry to perform a method, the method comprising: detecting a first type of defect in a random bit sequence; and generating an indication of whether detection of the first type of defect is repeated within a threshold number of bits of the random bit sequence based on the detection of the first type of defect.

BRIEF DESCRIPTION OF THE SEVERAL VIEWS OF THE DRAWINGS

The foregoing features and advantages, as well as others, will be described in detail in the following description of specific embodiments given by way of illustration and not limitation with reference to the accompanying drawings, in which.

DETAILED DESCRIPTION

Like features have been designated by like references in the various figures unless the context indicates otherwise. In particular, the structural and/or functional features that are common among the various embodiments may have the same references and may dispose identical structural, dimensional and material properties.

For the sake of clarity, only the steps and elements that are useful for an understanding of the embodiments described herein have been illustrated and described in detail. In particular, the digital random bit sources, meaning the source of the digital random bits, are not described hereafter. The described embodiments being compatible with usual digital random bit sources.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless otherwise specified, when reference is made to absolute positional qualifiers, such as the terms "front," "back," "top," "bottom," "left," "right," etc., or to relative positional qualifiers, such as the terms "above," "below," "upper," "lower," etc., or to qualifiers of orientation, such as "horizontal," "vertical," etc., reference is made to the orientation shown in the figures.

Moreover, in the description, when it referred to the entropy of random bits, it referred to the Shannon entropy.

Unless specified otherwise, the expressions "around," "approximately," "substantially" and "in the order of" signify within 10%, and within 5%.

In the following description, reference is made to binary values, of the bits, having two possible values, a "1" (one) or a "0" (zero). In practice, a bit may be represented by a voltage oscillating between two levels, a high level representing a "1" (one) and a low level representing a "0" (zero).

Figure 1:
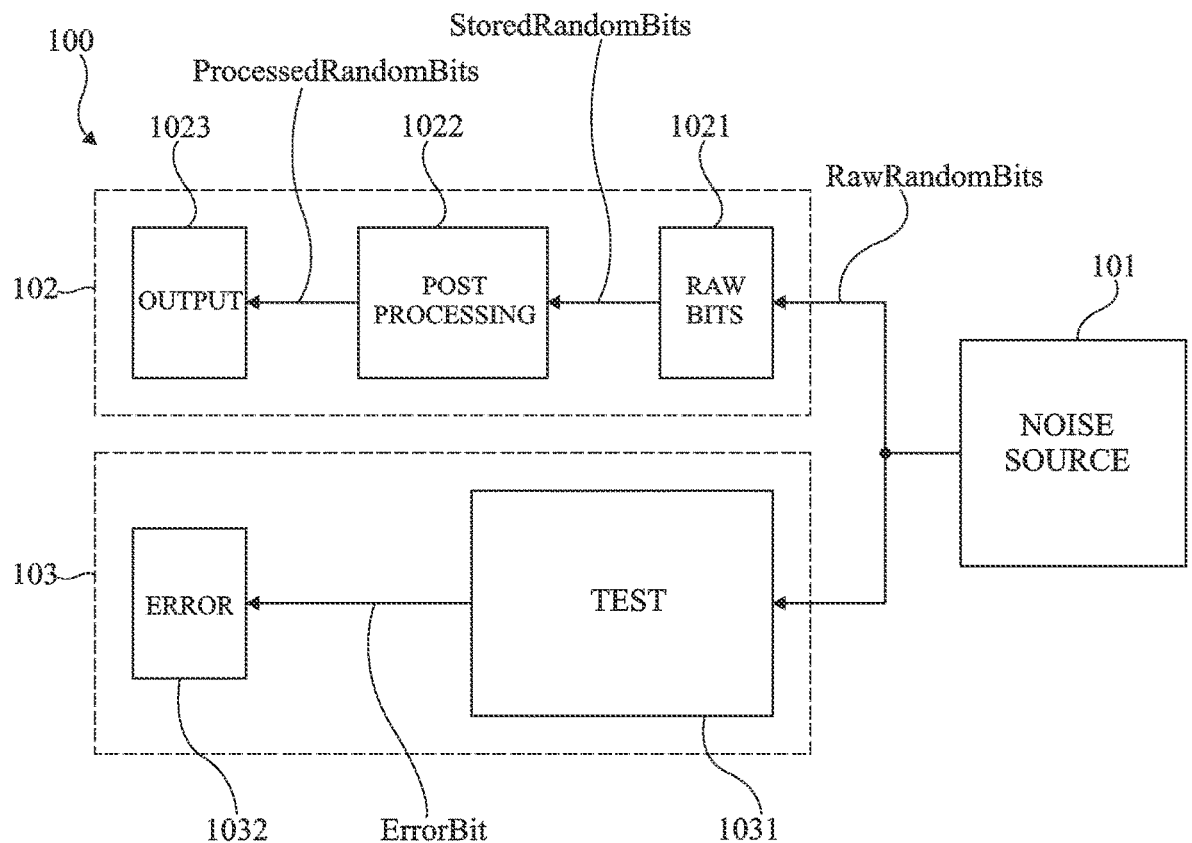
FIG. 1 schematically shows in the form of blocks an embodiment of a random number generator.

FIG. 1 schematically shows in the form of blocks an embodiment of a random number generator 100.

As previously mentioned, a random number generators (TRNG, True Random Number Generator) is a device adapted to delivering sequences of numbers, for example, of bits, for which there exists no deterministic link between a number and its predecessor(s). A generator of this type is generally used even within a more complete electronic system.

Random number generator 100 comprises a random bit source 101 (NOISE SOURCE). Source 101 comprises a noise source, digital or analog, and a digitizing stage of the noise of the noise source (not represented on FIG. 1). Source 101 delivers a series of random bits RawRandomBits. According to an example, source 101 may comprise one or a plurality of ring oscillators, and/or one or a plurality of phase lock loops (PLL).

Random number generator 100 comprises a branch 102 for processing the series of random bits RawRandomBits, and a branch 103 for testing source 101.

Processing branch 102 enables to make the series of random bits RawRandomBits accessible and, optionally, to apply a mathematical processing thereto. According to an example, branch 102 comprises:
- an input register 1021 (RAW BITS);
- a processing unit 1022 (POST PROCESSING); and
- an output register 1023 (OUTPUT).

Once generated by source 101, the bits of the series of random bits RawRandomBits are stored in the input register 1021 before their processing. Register 1021 delivers bits StoredRandomBits to processing unit 1022.

Processing unit 1022 applies a mathematical processing to the bits StoredRandomBits stored by input register 1021. Processing unit 1022 delivers, at its output, processed bits ProcessedRandomBits to output register 1023. The processing unit enables to increase the random character, and thus the reliability, of the series of random bits delivered by source 101. In other words, processing unit is missioned to accumulate the entropy by bit of bits StoredRandomBits, in order for each bit of bits ProcessedRandomBits to have an entropy of 1. According to an example, processing unit 1022 implements cipher algorithms, such as the AES (Advanced Encryption Standard), hash functions, or any other functions capable of increasing the entropy of a series of random bits. Processing unit 1022 is optional. Indeed, if it is considered that source 101 has a sufficient performance, the processing unit is not necessary, but, in practice, it is rarely the case.

Output register 1023 stores the processed bits ProcessedRandomBits, and makes them accessible for an electronic device, for example, a processor (See processor 402 of FIG. 4), requiring random bits.

Test branch 103 comprises an embodiment of a test system 1031 (TEST), and an error register 1032 (ERROR). Test branch 103 verifies all along the operation of source 101 whether it delivers a series of "sufficiently random" bits. More particularly, test branch 103 examines the series of random bits RawRandomBits delivered by source 101, and determines whether there exists a deterministic link between a bit and its predecessors by using different tests. For this purpose, defects may be looked for in the series of random bits.

Further, random number generators may be submitted to different methods enabling to certify their reliability, that is, the sufficiency of the random character of the random numbers, for example, of the bits, that they deliver. These methods are for example the SP800-90B method, or the AIS31 method. These standards impose to random number generators the performing of tests on the random bits and the application of a processing to these bits, such as the mathematical processing executed by processing unit 1022.

Test system 1031 receives as an input the series of random bits RawRandomBits and examines it. Test system 1031 is described in further detail in relation with FIG. 2. Test system 1031 outputs an error bit ErrorBit.

Error register 1032 stores error bit ErrorBit, and makes it accessible for an electronic device needing to verify the reliability of source 101, and thus the reliability of random number generator 100. According to an example, error register 1032 can make error bit ErrorBit accessible by allowing its reading, or by generating an interruption each time the value of error bit ErrorBit indicate that an error have been detected.

Figure 2:
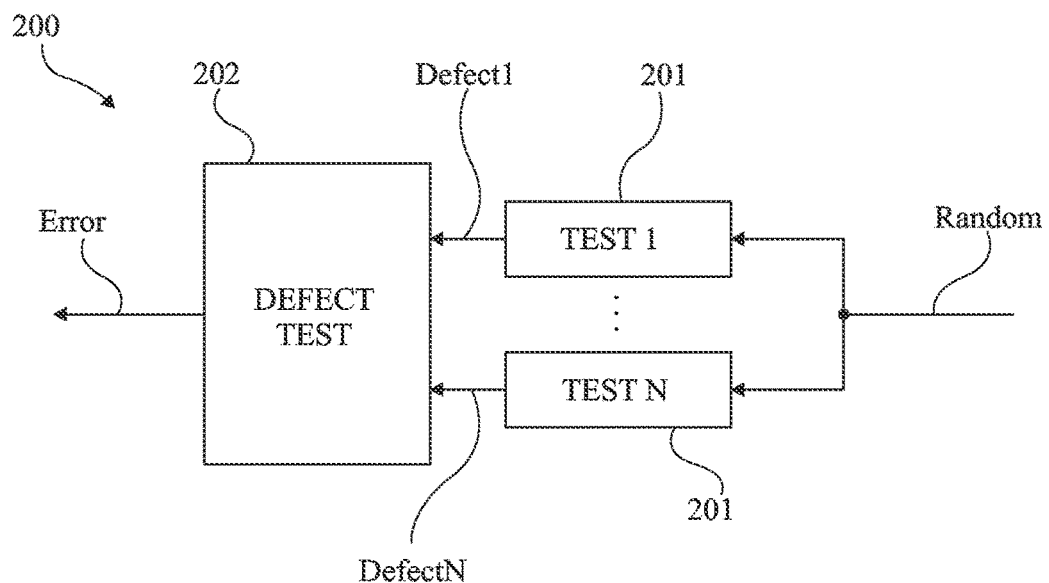
FIG. 2 schematically shows in the form of blocks an embodiment of a circuit for testing the random number generator of FIG. 1.

FIG. 2 schematically shows in the form of blocks an embodiment of a test system 200 of the type of the test system 1031 described in relation with FIG. 1.

Test system 200 is adapted to receiving a series of random bits Random, of the type of the series of random bits RawRandomBits described in relation with FIG. 1, and to delivering an error bit Error, of the type of the error bit ErrorBit described in relation with FIG. 1. The series of random bits Random is generated by a source (not shown in FIG. 2) of the type of the source 101 described in relation with FIG. 1.

Test system 200 is formed of two distinct portions. A first portion of test system 200 is adapted to verifying the series of random bits Random delivered by the source, and more particularly to looking for different defects in this series of bit Random. A second portion of system 200 is adapted to analyzing these defects and, more particularly, to determining whether the detected defects are true defects or if they are "false positives."

The first portion of test system 200 comprises one or a plurality, of test units or circuits 201 (TEST1, . . . , TEST N). Each test unit 201 receives as an input the series of random bits Random and outputs a defect bit Defect1, . . . , DefectN. Each test unit 201 is capable of looking for one or a plurality of defects in the series of random bits Random. If a test unit 201 detects a defect, its defect bit Defect1, . . . , DefectN may be set to "1" (one), or respectively set to "0" (zero). Different types of defects may be considered. Hereafter, at least two examples are detailed. Those skilled in the art will understand that other tests may be implemented, such as, for example, tests specific to the type of the source generating the series of random bits Random.

According to an example, a sequence of N bits all equal to "1" (one), or respectively to "0" (zero), in the series of random bits Random is considered as being a defect of the series of random bits. According to an example, N may be equal to 34. This test is called repetition test. Thus, a test unit 201 may verify whether the series of random bits Random comprises a series of N elements, for example, 34 elements, all equal to "1" (one), or respectively to "0" (zero). According to an example, a unit 201 may verify the presence of a sequence of N bits equal to "1" (one), and another test unit 201 may verify the presence of a sequence of N bits equal to "0" (zero).

According to another example, for the sum of M consecutive bits to be greater than a threshold SUM may be considered as a defect. According to an example, a defect may be for the sum of 1,024 consecutive bits to be greater than 628. This test is called "monobit" test. Thus, a test unit 201 may calculate the sum of the consecutive bits of the series of bits, and verify whether this sum is greater or not than threshold SUM.

The second portion of test system 200 comprises a test circuit 202 (DEFECT TEST). Test circuit 202 receives as an input the defect bits Defect1, . . . , DefectN of test units 201, and outputs error bit Error. Test circuit 202 is adapted to verify the apparition frequency of a defect detected by test unit 201. More particularly, each defect an apparition probability, as low as it is, test circuit 202 is adapted to verify that the apparition frequency is not superior to its apparition probability. According to an example, if a defect has an apparition probability of 1% and during the generation of one hundred random bits the defect appeared five times, then source of random bits presents a malfunction.

Moreover, Test circuit 202 is capable of verifying whether the defects detected by test units 201 are true defects or "false positives." Indeed, a defect may be a "false positive," that is, a defect present in the series of random bits which however does not imply a malfunction of the source generating these bits.

It is normal to have "false positive" defects. If a defect corresponds, for example, to a specific bit sequence, such as that looked for by a test of repetition test type, it is still possible for this specific sequence to have been randomly generated. More generally, if a defect has probability of occurrence, this means that when a sufficiently large number of bits is generated, this defect risks occurring without for all this being a defect of source 201. This sufficiently large number corresponds in particular to the inverse of the defect apparition probability. As an illustration, if a defect has a probability of occurrence of 1%, there is a chance over a hundred for this defect to occur during the generation of one hundred random bits.

According to an embodiment, test circuit 202 is adapted to enumerate, after the detection of a defect by a test unit 201, the number of random bits generated without the detection of another defect by a test unit 201. If the number of random bits is greater than threshold TH, then test circuit 202 considers that the source function correctly. The error bit is then set to a value which does not symbolize an error, for example, a "0" (zero). Otherwise, test circuit 202 considers that the source a malfunction. The error bit is then set to a value symbolizing an error, for example, a "1" (one).

Threshold TH may be defined as being the inverse of the probability P of the defect searched by test unit 201.

As shown in FIG. 2, test circuit is adapted to receiving defect bits from a plurality of test units 201. Test circuit 202 may then adapted to processing each defect bit Defect1, . . . , DefectN separately.

Figure 3:
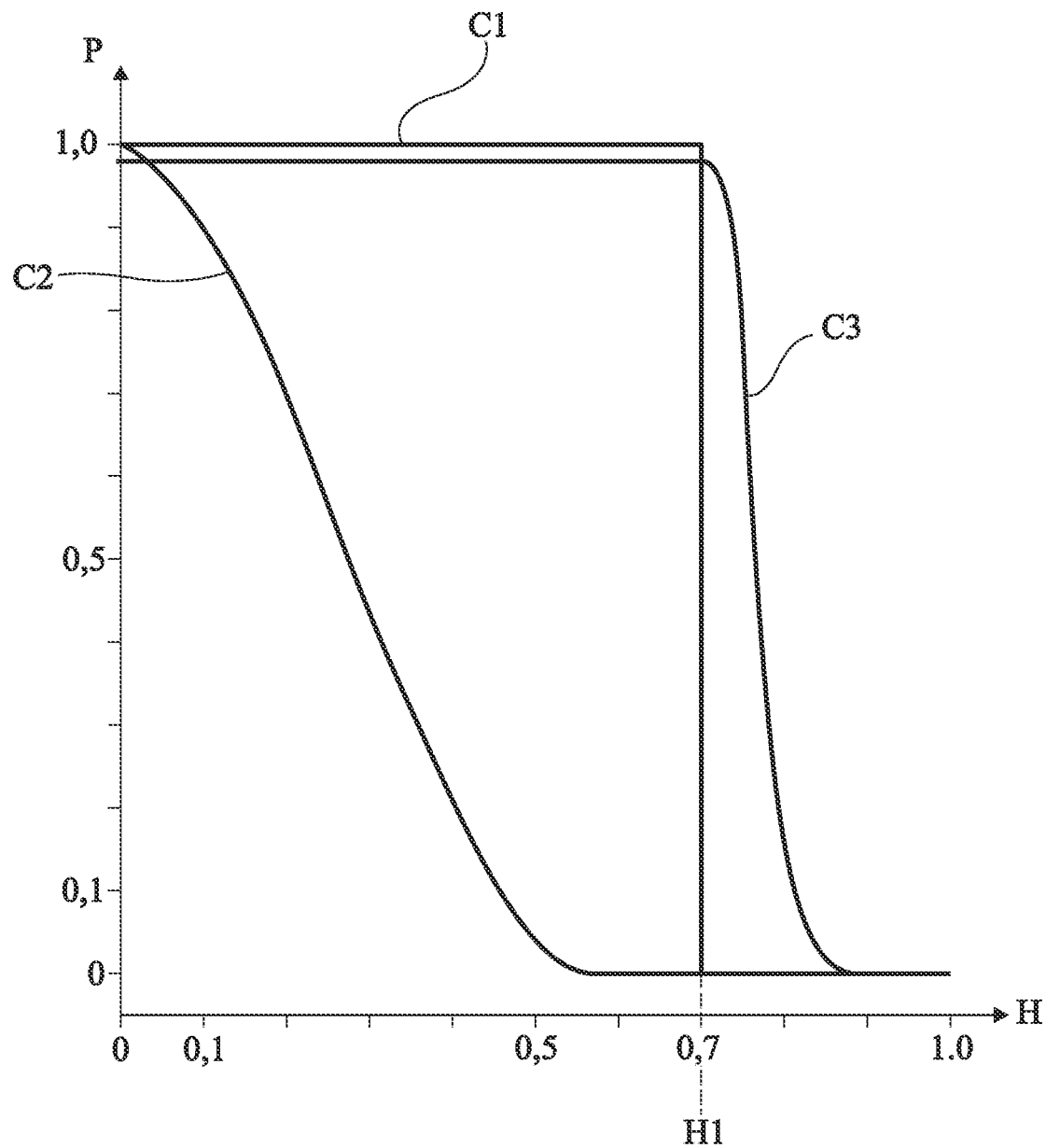
FIG. 3 shows a graph illustrating the performance of the random number generator of FIG. 1, this graph representing the defect apparition probability function of the entropy of the random number generator.

FIG. 3 shows a graph comparing the performance of two types of random number generators to the performance of an ideal random number generator.

The graph of FIG. 3 comprises two curves showing the variation of the probability P for the test branch of a random number generator to detect a defect on a series of random bits, according to its Shannon entropy H. The entropy H of a series of random bits enables to quantify the "disorder" of the series of bits, that is, the random character of the series of bits. The higher the entropy, the more the series of bits is "random," and thus the more the series of bits is satisfactory for the random number generator.

A curve C1 illustrate the ideal case of a random number generator of the type of the generator 100 described in relation with FIG. 1. Curve C1 is of the shape of a decreasing step. For an entropy comprised between 0 and an entropy H1, probability P is 1, and for an entropy superior to H1, probability P is 0. This curve symbolized that for a source furnishing random bits having an entropy superior to the entropy H1, the apparition of a defect is impossible.

The value of entropy H1 is defined empirically, for example, by considering the type of random bits source used in the random number generator, the use of the random number generator, etc.

A curve C2 illustrates the case of a random number generator of the type of the generator 100 described in relation with FIG. 1 but which comprises no test circuit of the type of the circuit 202 described in relation with FIG. 2. The generator of curve C2 indicates that it detects an error each time a defect is detected by test units 201. Curve C2 shows that, with no test circuit 202, the probability P of detection of a defect strongly decreases according to entropy. In other words, the higher the entropy, the more difficult it is to detect a defect.

A curve C3 illustrates the case of a random number generator of the type of the random number generator 100 described in relation with FIG. 1 and thus comprising a test circuit of the type of the circuit 202 described in relation with FIG. 2. Curve C3 is more fitting to curve C1. Curve C3 shows that the addition of test circuit 202 enables detection probability P to only decrease from an entropy value H1 greater than 0, for example, in the order of 0.7 $J.K^{-1}$.

An advantage of the use of a test circuit 202 is that it facilitates detecting a variation of the entropy based on the apparition of defects among generated random bits.

Various embodiments and variants have been described. Those skilled in the art will understand that certain features of these various embodiments and variants may be combined, and other variants will occur to those skilled in the art.

Finally, the practical implementation of the described embodiments and variations is within the abilities of those skilled in the art based on the functional indications given hereabove.

Figure 4:
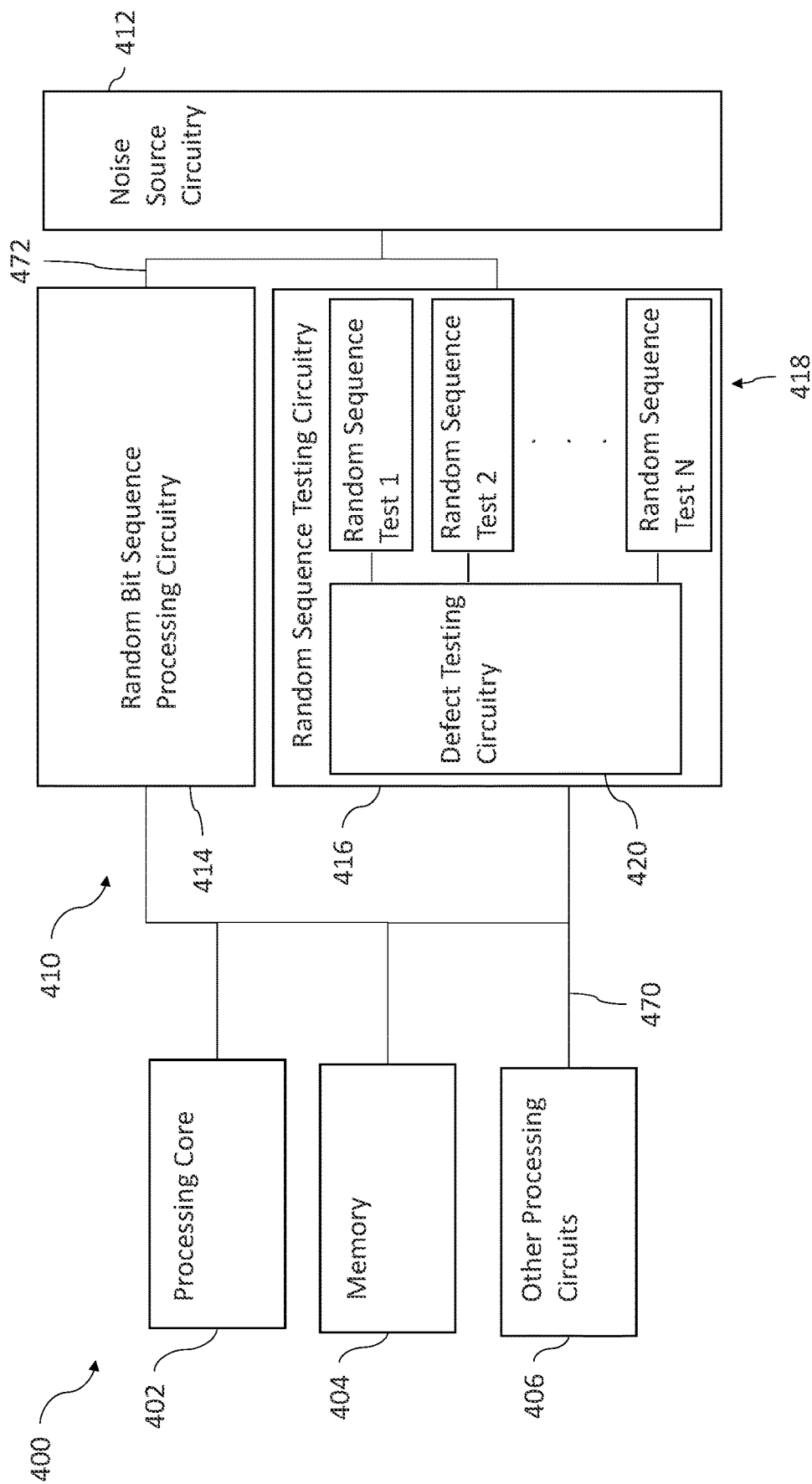
FIG. 4 schematically shows in the form of blocks an embodiment of a system including a random number generator and a circuit for testing a random number generator.

FIG. 4 is a functional block diagram of an embodiment of an electronic device or system 400 of the type to which the embodiments, which have been described, may apply. The system 400 comprises one or more processing cores or circuits 402. The processing cores 402 may comprise, for example, one or more processors, a state machine, a microprocessor, an MCU, a DSP, a programmable logic circuit, discrete circuitry, logic gates, registers, etc., and various combinations thereof. The processing cores 402 may control overall operation of the system 400, execution of application programs by the system 400, secure operations performed by the system 400, etc.

The system 400 includes one or more memories 404, such as one or more non-volatile memories and one or more volatile memories, which may store, for example, all or part of instructions and data related to control of the system 400, applications and operations performed by the system 400, etc.

The system 400 includes a random number generator or circuit 410. The random number generator 410 includes noise source circuitry 412, random bit sequence processing circuitry 414, and random sequence testing circuitry 416. The noise source 412 may be implemented, for example, using the noise source 101 described above with reference to FIG. 1. The random bit processing circuitry 414 may be implemented, for example, using the processing branch 102 described above with reference to FIG. 1.

The random sequence testing circuitry 416, as illustrated, comprises a plurality of random sequence testing circuits 1 to N 418, and defect testing circuitry 420. The random sequence testing circuits 418 may be implemented, for example, using the testing circuits 201 of FIG. 2. The defect testing circuitry 420 may be implemented, for example, using the defect test circuit 202 as described above with reference to FIG. 2.

The system 400 may include one or more other processing circuits 406, which may include antennas, power supplies, sensors (e.g., image sensors, audio sensors, accelerometers, pressure sensors, temperature sensors, encoders, etc.), controllers, security circuits (e.g., cryptographic processors, etc.), etc., and a main bus system 470. The main bus system 470 may include one or more data, address, power and/or control buses coupled to the various components of the system 400. The system 400 also may include additional bus systems such as bus system 472, which communicatively couples noise source 412 to the random bit sequence processing circuitry 414 and to the random sequence testing circuitry 416.

In operation, the random bit processing circuitry 414 may provide a random number sequence to processing circuitry (e.g., processing core 402 or other processing circuitry 406) generated by the random bit processing circuitry 414, and may provide an indication of the reliability of the random number generator (e.g., an interrupt to signal a malfunction of the noise source 412) generated by the random sequence testing circuitry 416.

Embodiments of the system 400 of FIG. 4 may include more components than illustrated, may include fewer components than illustrated, may combine illustrated components or split illustrated components, may couple components together in various ways, and various combinations thereof. For example, the random number generator or circuit 410 may be integrated into a processing core, or into the other processing circuitry 406 (e.g., integrated into a security circuit). The random sequence testing circuitry 416 may receive an output of the random bit sequence processing circuitry 414 instead of directly receiving a bit sequence from the noise source circuit 412, etc. The system 400 may comprise a system on a chip (SoC), discrete chips coupled together, etc., or various combinations thereof.

In an embodiment, a circuit (202) for testing a random number generator (100) adapted to delivering a series of random bits (RawRandomBits; Random) and may be summarized as including at least one test unit (201) configured to detect a defect in the series of random bits (RawRandomBits; Random), said test circuit (202) being adapted to verifying whether, after the detection of a first defect by the test unit (201), the number of random bits, generated by the random number generator (100) without the detection of a second defect by said unit test (201), is smaller than a first threshold (TH). The first threshold (TH) may be equal to the inverse of the probability (P) of occurrence of said defect. The defect may be a series of N successive bits all of same value. The defect may be a series of N successive bits, all equal to "1" (one). The defect may be a series of N successive bits all equal to "0" (zero). N may be equal to 34. The defect may be a series of M successive bits having a sum greater than a second threshold (SUM). The series of successive bits M may be equal to 1,024 and the second threshold (SUM) may be equal to 628. The random number generator (100) may include at least two test units (201) arranged in parallel. Said at least two test units (201) may look for different defects. A random number generator (100) may be summarized as including a test circuit. The generator may include a source (101) capable of generating the series of random bits (RawRandomBits; Random). The source (101) may include a noise source and a digitizing stage. The generator may include a processing unit (1022) adapted to applying a mathematical processing to the series of random bits (RawRandomBits; Random).

In an embodiment, a device comprises: an input, which in operation, receives indications of detection of a first type of defect in a random bit sequence; defect testing circuitry, coupled to the input, wherein the defect testing circuitry, in operation, generates an indication of whether detection of the first type of defect is repeated within a threshold number of bits of the random bit sequence. In an embodiment, the threshold number of bits is equal to an inverse of a probability of occurrence of the first type of defect. In an embodiment, the first type of defect is a series of N successive bits having a same value. In an embodiment, the same value is 1. In an embodiment, the same value is 0. In an embodiment, N is equal to 34. In an embodiment, the first type of defect is a series of M successive bits having a sum greater than a threshold sum. In an embodiment, M is equal to 1,024 and the threshold sum is equal to 628. In an embodiment, the device comprises: a second input, which in operation, receives indications of detection of a second type of defect in the random bit sequence, wherein the defect testing circuitry is coupled to the second input, and the defect testing circuitry, in operation, generates an indication of whether detection of the second type of defect is repeated within a second threshold number of bits of the random bit sequence.

In an embodiment, a system, comprises: a plurality of random sequence error detection circuits, which, in operation, detect errors in a random bit sequence; and defect testing circuitry, coupled to the plurality of random sequence error detection circuits, wherein the defect testing circuitry, in operation, generates an indication of whether one of the plurality of random sequence error detection circuits detects two errors in the random bit sequence within a threshold number of bits of the random bit sequence. In an embodiment, the plurality of random sequence error detection circuits, in operation, detect respective types of errors in the random bit sequence. In an embodiment, the system comprises: a random number generator coupled to the plurality of random sequence error detection circuits, wherein the random number generator, in operation, generates the random bit sequence. In an embodiment, the random number generator comprises a noise source and digitizing circuitry. In an embodiment, the system comprises: bit sequence processing circuitry coupled to the random number generator, wherein the bit sequence processing circuitry, in operation, applies digital signal processing to the random bit sequence, generating a random number. In an embodiment, the threshold number of bits is equal to an inverse of a probability of occurrence of a type of defect detected by the one of the plurality of random sequence error detection circuits. In an embodiment, the type of defect detected by the one of the plurality of random sequence error detection circuits is a series of N successive bits having a same value. In an embodiment, N is equal to 34. In an embodiment, the type of defect detected by the one of the plurality of random sequence error detection circuits is a series of M successive bits having a sum greater than a threshold sum. In an embodiment, M is equal to 1,024 and the threshold sum is equal to 628. In an embodiment, the plurality of random sequence error detection circuits, in operation, detect different types of errors in the random bit sequence; and the defect testing circuitry, generates respective indications of whether the plurality of random sequence error detection circuits detect two errors in the random bit sequence within respective threshold numbers of bits of the random bit sequence.

In an embodiment, a method comprises: detecting a first type of defect in a random bit sequence; and generating an indication of whether detection of the first type of defect is repeated within a threshold number of bits of the random bit sequence based on the detection of the first type of defect. In an embodiment, the threshold number of bits is equal to an inverse of a probability of occurrence of the first type of defect. In an embodiment, the first type of defect is a series of M successive bits having a sum greater than a threshold sum. In an embodiment, M is equal to 1,024 and the threshold sum is equal to 628. In an embodiment, the method comprises detecting a second type of defect in the random bit sequence; and generating an indication of whether detection of the second type of defect is repeated within a second threshold number of bits of the random bit sequence based on the detection of the second type of defect.

In an embodiment, a non-transitory computer-readable medium's contents cause processing circuitry to perform a method, the method comprising: detecting a first type of defect in a random bit sequence; and generating an indication of whether detection of the first type of defect is repeated within a threshold number of bits of the random bit sequence based on the detection of the first type of defect. In an embodiment, the threshold number of bits is equal to an inverse of a probability of occurrence of the first type of defect. In an embodiment, the method comprises: detecting a second type of defect in the random bit sequence; and generating an indication of whether detection of the second type of defect is repeated within a second threshold number of bits of the random bit sequence based on the detection of the second type of defect. In an embodiment, the contents comprise instructions executed by the processing circuitry.

Some embodiments may take the form of or comprise computer program products. For example, according to one embodiment there is provided a computer readable medium comprising a computer program adapted to perform one or more of the methods or functions described above. The medium may be a physical storage medium, such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:
    a random sequence generator, which, in operation, generates a random bit sequence;
    data processing circuitry, coupled to the random sequence generator, wherein the data processing circuitry, in operation, performs data processing operations using the random bit sequence;
    an input, which in operation, receives indications of detection of a first type of defect in the random bit sequence;
    defect testing circuitry, coupled to the input and to the data processing circuitry, wherein the defect testing circuitry, in operation:
        generates an indication of whether detection of the first type of defect is repeated within a first threshold number of bits of the random bit sequence; and
        generates an indication of a malfunction of the random sequence generator based on the generated indication of whether detection of the first type of defeat is repeated within a first threshold number of bits of the random bit sequence; and
    a second input, which in operation, receives indications of detection of a second type of defect in the random bit sequence, wherein the defect testing circuitry is coupled to the second input, and the defect teting circuitry, in operation, generates an indication of whether detection of the second type of defect is repeated within a second threshold number of bits of the random bit sequence, wherein the second type of defect is a differet type of defect than the first type of defect.

2. The device according to claim 1, wherein the first threshold number of bits is equal to an inverse of a probability of occurrence of the first type of defect.

3. The device according to claim 1, wherein the first type of defect is a series of N successive bits having a same value.

4. The device according to claim 3, wherein the same value is 1.

5. The device according to claim 3, wherein the same value is 0.

6. The device according to claim 3, wherein N is equal to 34.

7. The device according to claim 1, wherein the first type of defect is a series of M successive bits having a sum greater than a threshold sum.

8. The device according to claim 7, wherein M is equal to 1,024 and the threshold sum is equal to 628.

9. The device of claim 1, wherein the first threshold number of bits is different from the second threshold number of bits.

10. The device of claim 1, wherein the data processing operations are cryptographic processing operations.

11. The device of claim 10, wherein the indication of a malfunction is an interrupt signal.

12. A system, comprising:
processing circuitry, which, in operation, performs one or more processing operations using random bit sequences;
a plurality of random sequence error detection circuits, which, in operation, detect errors in random bit sequences; and
defect testing circuitry, coupled to the plurality of random sequence error detection circuits and to the processing circuitry, wherein the defect testing circuitry, in operation:
generates an indication of whether one of the plurality of random sequence error detection circuits detects two errors in a random bit sequence within the threshold number of bits of the random bit sequence; and
generates an interrupt signal based on the generated indication of whether one of the plurality of random sequence error detection circuits two in the random bit sequence within the threshold number of bits of the random bit sequence, wherein
the plurality of random sequence error detection circuits, in operation, detect respective different types of erros in the random bit sequence; and
the defect testing circuitry, in operation,generates respective indications of whether the plurality of random sequence error detection circuits detect two errors in the random bit sequence within respective threshold numbers of bits of the random bit sequence.

13. The system of claim 12, comprising:
a random number generator coupled to the plurality of random sequence error detection circuits and to the processing circuitry, wherein the random number generator, in operation, generates the random bit sequence.

14. The system of claim 13, wherein the random number generator comprises a noise source and digitizing circuitry.

15. The system according to claim 13, comprising:
bit sequence processing circuitry coupled to the random number generator, wherein the bit sequence processing circuitry, in operation, applies digital signal processing to the random bit sequence, generating a random number.

16. The system of claim 12, wherein the threshold number of bits is equal to an inverse of a probability of occurrence of a type of defect detected by the one of the plurality of random sequence error detection circuits.

17. The system of claim 16, wherein the type of defect detected by the one of the plurality of random sequence error detection circuits is a series of N successive bits having a same value.

18. The system of claim 17, wherein N is equal to 34.

19. The system of claim 16, wherein the type of defect detected by the one of the plurality of random sequence error detection circuits is a series of M successive bits
having a sum greater than a threshold sum.

20. The system of claim 19, wherein M is equal to 1,024 and the threshold
sum is equal to 628.

21. The system of claim 12, wherein,
the respective threshold numbers of bits of the random bit sequence are different from each other.

22. The system of claim 12, wherein the one or more processing operations include cryptographic processing operations.

23. A method, comprising:
generating a random bit sequence using a random number generator;
generating an indication of a reliability of the random number generator; and
performing one or more processing operations based on the random bit sequence and the indication of the reliability of the random number generator, wherein the generating the indication of the reliability of the random number generator includes:
detecting a first type of defect in the random bit sequence; and
generating an indication of whether detection of the first type of defect is repeated within a first threshold number of bits of the random bit sequence based on the detection of the first type of defect, wherein the generating the indication of the reliabilit of the random number generator includes:
detecting a second type of detect in the random bit sequence, wherein the second type of defect is a different type of defect than the first type of defect; and
generating an indication of whether detection of the second type of defect is repeated within a second threshold number of bits of the random bit sequence based on the detection of the second type of detect.

24. The method of claim 23, wherein the first threshold number of bits is equal to an inverse of a probability of occurrence of the first type of defect.

25. The method of claim 23, wherein the first type of defect is a series of M successive bits having a sum greater than a threshold sum.

26. The method of claim 25, wherein M is equal to 1,024 and the threshold sum is equal to 628.

27. The method of claim 23, wherein the first threshold number of bits is different than the second threshold number of bits.

28. A non-transitory computer-readable medium having contents which cause processing circuitry to perform a method, the method comprising:
generating a random bit sequence using a random number generator;

generating an indication of a reliability of the random number generator; and performing one or more processing operations based on the random bit sequence and the indication of the reliability of the random number generator, wherein the generating the indication of the reliability of the random number generator includes:

detecting a first type of defect in the random bit sequence;

generating an indication of whether detection of the first type of defect is repeated within a first threshold number of bits of the random bit sequence based on the detection of the first type of defect;

detecting a second type of defect in the random bit sequence, wherein the second type of defect is a different type of defect than the first type of defect; and generating an indication of whether detection of the second type of defect is repeated within a second threshold number of bits of the random bit sequence based on the detection of the second type of defect.

29. The non-transitory computer-readable medium of claim 28, wherein the first threshold number of bits is equal to an inverse of a probability of occurrence of the first type of defect.

30. The non-transitory computer-readable medium of claim 28, wherein the first threshold number of bits is different than the second threshold number of bits.

31. The non-transitory computer-readable medium of claim 28, wherein the
contents comprise instructions executed by the processing circuitry.

* * * * *

UNITED STATES PATENT AND TRADEMARK OFFICE
CERTIFICATE OF CORRECTION

| | | |
|---|---|---|
| PATENT NO. | : 12,019,510 B2 | Page 1 of 1 |
| APPLICATION NO. | : 17/684198 | |
| DATED | : June 25, 2024 | |
| INVENTOR(S) | : Albert Martinez et al. | |

It is certified that error appears in the above-identified patent and that said Letters Patent is hereby corrected as shown below:

In the Claims

Column 10, Claim 1, Line 65:
"the defect teting" should read: --the defect testing--.

Column 11, Claim 1, Line 3:
"is a differet type" should read: --is a different type--.

Column 11, Claim 12, Lines 42-43:
"sequence within the threshold" should read: --sequence within a threshold--.

Column 11, Claim 12, Line 47:
"circuits two in the random" should read: --circuits detects two errors in the random--.

Column 11, Claim 12, Line 49:
"sequence, wherein" should read: --sequence, wherein,--.

Column 11, Claim 12, Line 51:
"types of erros in" should read: --types of errors in--.

Column 12, Claim 23, Line 43:
"the reliabilit of" should read: --the reliability of--.

Column 12, Claim 23, Line 45:
"type of detect in" should read: --type of defect in--.

Column 12, Claim 23, Line 51:
"type of detect." should read: --type of defect.--.

Signed and Sealed this
Thirteenth Day of August, 2024

Katherine Kelly Vidal
*Director of the United States Patent and Trademark Office*